United States Patent [19]

Tanabe et al.

[11] Patent Number: 5,525,686
[45] Date of Patent: Jun. 11, 1996

[54] POLYVALENT METAL SALT OF SALICYCLIC ACID RESIN AND PROCESS FOR PREPARING IT

[75] Inventors: Yoshimitsu Tanabe; Jotaro Kida; Kiyoharu Hasegawa; Masakatsu Nakatsuka, all of Kanagawa-ken; Masayuki Furuya; Takeshi Nishimura, both of Fukuoka-ken, all of Japan

[73] Assignee: Mitsui Toatsu Chemicals, Inc., Tokyo, Japan

[21] Appl. No.: 357,164

[22] Filed: Dec. 13, 1994

[30] Foreign Application Priority Data

Dec. 21, 1993 [JP] Japan .................... 5-321725

[51] Int. Cl.⁶ .................... C08G 83/00
[52] U.S. Cl. .................... 525/539; 503/210; 503/211; 503/212; 503/216; 528/205; 528/206; 528/392
[58] Field of Search .................... 525/539; 528/205, 528/206, 392; 503/210, 211, 212, 216

[56] References Cited

U.S. PATENT DOCUMENTS

| | | | |
|---|---|---|---|
| 3,983,292 | 9/1976 | Saito et al. | 428/306 |
| 4,748,259 | 5/1988 | Nachbur | 556/132 |
| 4,929,710 | 5/1990 | Scholl et al. | 528/205 |
| 4,952,648 | 8/1990 | Yamaguchi et al. | 525/539 |

FOREIGN PATENT DOCUMENTS

| | | |
|---|---|---|
| 51-25174 | 7/1976 | Japan . |
| 63-112537 | 5/1988 | Japan . |
| 1-133780 | 5/1989 | Japan . |
| 2-91043 | 3/1990 | Japan . |
| 5-75736 | 10/1993 | Japan . |

Primary Examiner—Shelley A. Dodson
Assistant Examiner—P. Hampton-Hightower
Attorney, Agent, or Firm—Burns, Doane, Swecker & Mathis

[57] ABSTRACT

A process for preparing a polyvalent metal salt of a salicylic acid resin which comprises the steps of reacting salicylic acid or its derivative with styrene or its derivative at a temperature of −20° C. or higher but lower than 40° C. in the presence of sulfuric acid, and then reacting the resulting reaction product with a polyvalent metal compound; an aqueous dispersion in which the polyvalent metal salt of the resin is dispersed in water; and a developing sheet in which the polyvalent metal salt of the salicylic acid resin is used.

6 Claims, 1 Drawing Sheet

F I G. 1
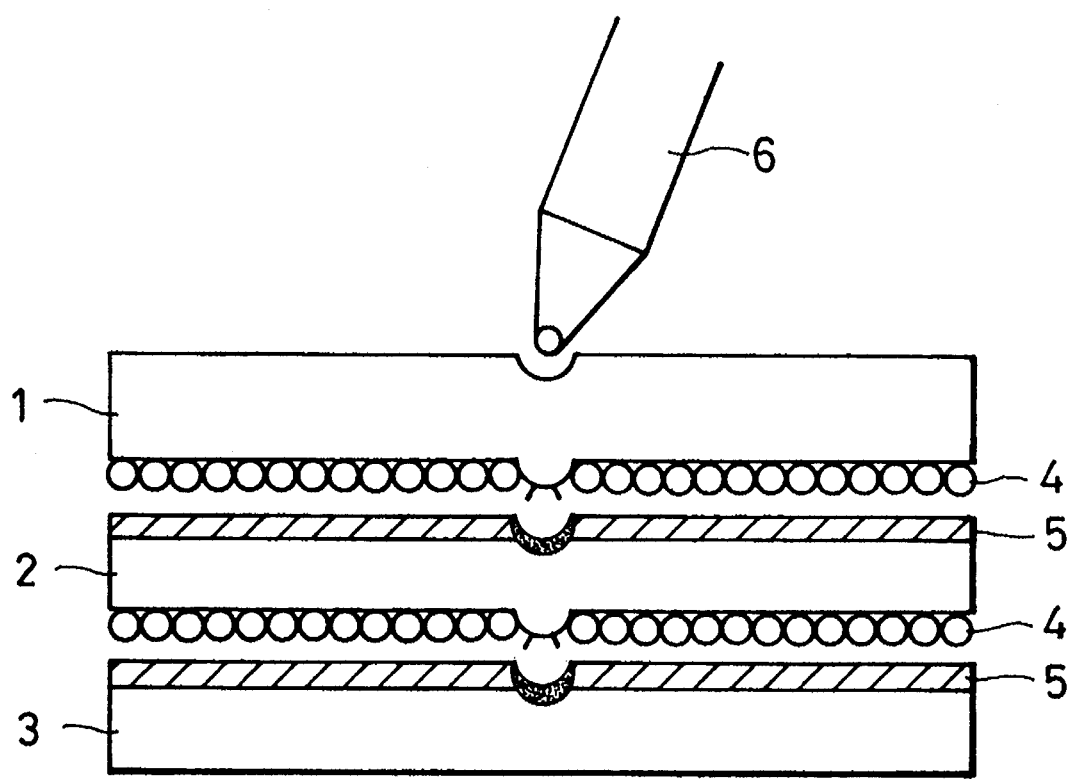

5,525,686

POLYVALENT METAL SALT OF SALICYCLIC ACID RESIN AND PROCESS FOR PREPARING IT

BACKGROUND OF THE INVENTION (a) Field of the Invention

The present invention relates to a polyvalent metal salt of a salicylic acid resin useful as a developer for a recording material for use in pressure sensitive recording material and the like, and a process for preparing the polyvalent metal salt of the resin. In addition, it relates to an aqueous dispersion in which the polyvalent metal salt of the salicylic acid resin is dispersed, and a developing sheet in which the polyvalent metal salt of the resin is used.

(b) Description of the Prior Art

It is known that metal salts of salicylic acid derivatives are useful as developers for pressure sensitive recording materials, and methods for preparing and utilizing various salicylic acid derivatives and their metal salts have been heretofore disclosed.

1. A 3,5-disubstituted salicylic acid derivative has been prepared from a corresponding 2,4-disubstituted phenol derivative and carbon dioxide by the utilization of the so-called Kolbe-Schmitt reaction (Japanese Patent Publication No. 25174/1976 and U.S. Pat. No. 3,983,292).

In this method, however, two steps are required to manufacture the 3,5-disubstituted salicylic acid derivative from phenol, and for the reaction of carbon dioxide, a specific high-temperature high-pressure device is necessary and so the inconvenience of facilities for the manufacture is present. Furthermore, when a metal salt of the 3,5-disubstituted salicylic acid derivative, for example, zinc salt of 3,5-di($\alpha$-methylbenzyl)salicylic acid is used as a developer for pressure sensitive recording material, there is a problem that a colored image disappears with water.

2. Another method is known in which 1 mol of salicylic acid is reacted with at least 2 mols of a phenyl ethanol derivative to produce 4-[$\alpha$-methylbenzyl($\alpha$-methylbenzyl)] salicylic acid derivative (Japanese Patent Publication No. 61110/1993 and U.S. Pat. No. 4,754,063).

3. Methods for preparing a polyvalent metal salt of 3,5-di($\alpha$-methylbenzyl)salicylic acid derivative and a polyvalent metal salt of 4-[$\alpha$-methylbenzyl($\alpha$-methylbenzyl)] salicylic acid derivative are disclosed in which 1 mol of salicylic acid is reacted with at least 2 mols of a styrene derivative in the presence of an aromatic sulfonic acid, and the resulting reaction product is then reacted with a polyvalent metal salt of an inorganic acid or a lower aliphatic carboxylic acid (Japanese Patent Publication No. 75736/1993 and U.S. Pat. No. 4,748,259).

When the polyvalent metal salt (e.g., a zinc salt) of 4-[$\alpha$-methylbenzyl($\alpha$-methylbenzyl)]salicylic acid prepared by these methods is used as a developer for pressure sensitive recording material, the resulting colored image is poor in storage stability, and for example, if brought into contact with water, the colored image disappears inconveniently.

4. Still another method is disclosed in which salicylic acid is reacted with a styrene compound in the presence of an aliphatic carboxylic acid by the use of an organic sulfonic acid or an inorganic acid as a catalyst to produce a 3,5-di($\alpha$-methylbenzyl)salicylic acid derivative (Japanese Patent Application Laid-open No. 91043/1990).

When a polyvalent metal salt (e.g., a zinc salt) of 3,5-di($\alpha$-methylbenzyl)salicylic acid prepared by these methods is used as a developer for pressure sensitive recording material, the resulting colored image is poor in storage stability, and for example, if brought into contact with water, the colored image disappears inconveniently, as in the above case.

5. There is disclosed a further method in which a salicylic acid derivative is reacted with a styrene derivative at 40° to 170° C. in the presence of an acid catalyst, and the resulting reaction product is then reacted with a metal salt of a fatty acid to form a metal salt of a polymeric salicylic acid resin (Japanese Patent Application Laid-open No. 112537/1988 and U.S. Pat. No. 4,929,710). However, the metal salt of the salicylic acid resin formed by this method is often colored disadvantageously. Moreover, when the metal salt (e.g., a zinc salt) of the polymeric salicylic acid resin formed by this method is used as a developer for pressure sensitive recording material, it is difficult to bring the zinc salt into fine particles at the time of dispersion, and the resulting dispersion is liable to coagulate inconveniently. In addition, a developing sheet for pressure sensitive recording material which can be prepared by the use of the resulted polyvalent metal salt of the salicylic acid resin has a drawback such as poor abrasion resistance, which is not preferable as the developer for the pressure sensitive recording materials.

6. Furthermore, a method for manufacturing a polyvalent metal salt of a salicylic acid resin is disclosed which comprises reacting a salicylic acid ester with a styrene, hydrolyzing the resultant salicylic acid ester resin, and then reacting a polyvalent metal compound with the hydrolyzed resin (Japanese Patent Application Laid-open No. 133780/1989 and U.S. Pat. No. 4,952,648). For example, there is described a method which comprises reacting methyl salicylate with styrene in the presence of concentrated sulfuric acid to form a methyl salicylate resin, hydrolyzing this resin with an aqueous alkaline solution, and then reacting the hydrolyzed resin with a polyvalent metal compound (e.g., zinc sulfate) to produce the polyvalent metal salt of the salicylic acid resin. However, when used as a developer for pressure sensitive recording material, the polyvalent metal salt (e.g., zinc salt) of the salicylic acid resin obtained by this method is scarcely brought into fine particles at the time of dispersion, and the resultant dispersion is liable to coagulate inconveniently.

As described above, the performance of the product obtained by the reaction between a salicylic acid derivative and a styrene derivative and the polyvalent metal salt of this product depends upon the given reaction conditions (e.g., catalyst, solvent, reaction temperature and the like). Therefore, physical properties of the product and the polyvalent metal salt of the product cannot be determined in a theoretical manner, and it is also very difficult to presume them on the basis of experience. Nowadays, it is expected that the above performance and physical properties are elucidated and established by experimental procedures.

In recent years, there is desired a developer which can easily be prepared as fine particles and which is excellent in storage stability as a dispersion, is excellent in storage stability (e.g., water resistance) as a colored image in the case that a developing sheet for pressure sensitive recording material is formed therefrom, and is excellent in abrasion resistance stability.

SUMMARY OF THE INVENTION

The first object of the present invention is to provide a polyvalent metal salt of a salicylic acid resin useful as a developer for pressure sensitive recording material, and a process for preparing the same.

The second object of the present invention is to provide an aqueous dispersion having excellent storage stability and excellent dispersion properties in which the polyvalent metal salt of the resin is dispersed.

The third object of the present invention is to provide a developing sheet in which the polyvalent metal salt of the resin is used and which is excellent in the storage stability of the color density of a colored image, water resistance and the like, and is further excellent in abrasion resistance.

In order to comply with the above objects, the present inventors have intensively investigated a polyvalent metal salt of a salicylic acid derivative, and as a result, the present invention has been attained. That is to say, a first aspect of the present invention is directed to a process for preparing a polyvalent metal salt of a salicylic acid resin which comprises the steps of reacting salicylic acid or its derivative represented by the formula (1)

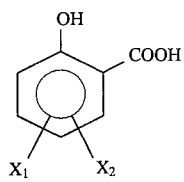

(1)

wherein $X_1$ and $X_2$ are each a hydrogen atom, an alkyl group, an alkoxy group or a halogen atom,
with styrene or its derivative represented by the formula (2)

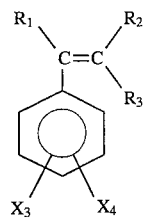

(2)

wherein $R_1$, $R_2$ and $R_3$ are each a hydrogen atom or an alkyl group; $X_3$ and $X_4$ are each a hydrogen atom, an alkyl group, an alkoxy group, an aralkyl group, an aryl group or a halogen atom,
at a temperature of $-20°$ C. or higher but lower than $40°$ C. in the presence of sulfuric acid, and then reacting the resulted reaction product with a polyvalent metal compound.

The second aspect of the present invention is directed to an aqueous dispersion in which the polyvalent metal salt of the salicylic acid resin is dispersed in water.

The third aspect of the present invention is directed to a developing sheet in which the polyvalent metal salt of the resin is used.

BRIEF DESCRIPTION OF THE DRAWINGS

The above and other objects, features and advantages of the present invention will become apparent from the following description of the invention and the appended claims, taken in conjunction with the accompanying drawings, in which:

FIG. 1 is a schematic cross-sectional view showing the structure of a pressure-sensitive copying paper sheet. Here, reference numeral 1 is a CB-sheet, numeral 2 is a CF/CB-sheet, 3 is a CF-sheet, 4 is a microcapsule layer, 5 is a developer layer, and 6 is the external pressure of a ball-point pen or a typewriter.

DETAILED DESCRIPTION OF THE INVENTION AND PREFERRED EMBODIMENTS

In the formula (1)

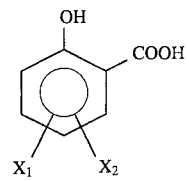

(1)

$X_1$ and $X_2$ are each a hydrogen atom, an alkyl group, an alkoxy group or a halogen atom, and preferably it is the hydrogen atom, an alkyl group having 1 to 12 carbon atoms, an alkoxy group having 1 to 12 carbon atoms, a fluorine atom, a chlorine atom or a bromine atom. Above all, the hydrogen atom is particularly preferable.

Thus, examples of the compound represented by the formula (1) include salicylic acid, 3-methylsalicylic acid, 4-methylsalicylic acid, 5-methylsalicylic acid, 3-n-butylsalicylic acid, 6-methylsalicylic acid, 6-ethylsalicylic acid, 5-isopropylsalicylic acid, 4-n-pentylsalicylic acid, 5-cyclohexylsalicylic acid, 5-n-octylsalicylic acid, 5-tert-octylsalicylic acid, 4-nonylsalicylic acid, 5-nonylsalicylic acid, 4-n-dodecylsalicylic acid, 4-methoxysalicylic acid, 6-methoxysalicylic acid, 5-ethoxysalicylic acid, 6-isopropoxysalicylic acid, 4-n-hexyloxysalicylic acid, 4-n-decyloxysalicylic acid, 5-fluorosalicylic acid, 3-chlorosalicylic acid, 4-chlorosalicylic acid, 5-chlorosalicylic acid and 5-bromosalicylic acid, and the examples are not restrictive. These salicylic acid derivatives may be used singly or in a combination of two or more thereof. Above all, salicylic acid or an alkyl substituted salicylic acid derivative such as 3-methylsalicylic acid is preferable, and salicylic acid is particularly preferable.

In the formula (2)

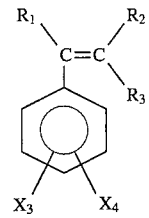

(2)

$R_1$, $R_2$ and $R_3$ are each a hydrogen atom or an alkyl group, and preferably it is the hydrogen atom or an alkyl group having 1 to 4 carbon atoms. Particularly preferable is the hydrogen atom.

In the formula (2), $X_3$ and $X_4$ are each a hydrogen atom, an alkyl group, an alkoxy group, an aralkyl group, an aryl group or a halogen atom, and preferably it is the hydrogen atom, an alkyl group having 1 to 12 carbon atoms, an alkoxy having 1 to 12 carbon atoms, an aralkyl group having 7 to 10 carbon atoms, an aryl group having 6 to 10 carbon atoms, a fluorine atom, a chlorine atom or a bromine atom. Above all, the hydrogen atom is particularly preferable.

Thus, examples of the compound represented by the formula (2) include styrene, 2-methylstyrene, 3-methylstyrene, 4-methylstyrene, 2-ethylstyrene, 4-ethylstyrene, 3-isopropylstyrene, 4-isopropylstyrene, 4-n-butylstyrene, 4-tert-butylstyrene, 4-cyclohexylstyrene, 4-n-octylstyrene, 4-n-decylstyrene, 2,4-dimethylstyrene, 2,5-dimethylstyrene, 3-methoxystyrene, 4-methoxystyrene, 4-ethoxystyrene, α-methylstyrene, α-ethylstyrene, α-n-butylstyrene, α-isobutylstyrene, α,β-dimethylstyrene, α,β-diethylstyrene, α-methyl-β-isopropylstyrene, α-n-propyl-β-methylstyrene, 4-(α,α-dimethylbenzyl)styrene, 4-phenylstyrene, 4-fluorostyrene, 2-chlorostyrene, 3-chlorostyrene, 4-chlorostyrene and 4-bromostyrene, and these examples are not restrictive. These styrene derivatives may be used singly or in a combination of two or more thereof. Above all, styrene or an alkyl substituted styrene derivative such as 4-methylstyrene or α-methylstyrene is preferable, and styrene is particularly preferable.

A process for preparing a polyvalent metal salt of a salicylic acid resin according to the present invention comprises reacting the compound represented by the formula (1) [hereinafter referred to as "compound (1)"] with the compound represented by the formula (2) [hereinafter referred to as "compound (2)"] (hereinafter referred to as "reaction A"), and then reacting the resulted reaction product with a polyvalent metal compound (hereinafter referred to as "reaction B"). Next, these reactions will be described in more detail.

Reaction A

The amount of the compound (2) is preferably in the range of from about 1 to 10 mols, preferably from about 1.5 to 8 mols, more preferably from 2 to 6 mols, based on 1 mol of the compound (1).

The reaction A is carried out in the presence of sulfuric acid, and no particular restriction is put on the amount of sulfuric acid to be used. The employment of a large amount of sulfuric acid does not have a bad influence on characteristics of the product, but the employment itself of the large amount only deteriorates operation efficiency, productivity and the like. The amount of sulfuric acid is usually 5% by weight or more, preferably in the range of from 5 to 200% by weight, more preferably from 10 to 100% by weight based on the weight of the compound (1). The concentration of sulfuric acid which can be used is about 90% by weight or more, preferably about 93% by weight or more, more preferably 95% by weight or more. In addition, sulfuric acid can be used together with fuming sulfuric acid.

The reaction A is preferably carried out in the presence of an organic solvent, though it can be done without the organic solvent. Any organic solvent can be used, so long as it is inert to the reaction. Examples of the organic solvent include hydrocarbon solvents such as hexane, octane, decane, cyclohexane, benzene, toluene and xylene, ester solvents such as ethyl acetate, butyl acetate and amyl acetate, ether solvents such as tetrahydrofuran and dioxane, and halogenated hydrocarbon solvents such as dichloromethane, 1,2-dichloromethane, tetrachloromethane, 1,1-dichloroethane, 1,1,1-trichloroethane, 1,1,2-trichloroethane, 1,1,2,2-tetrachloroethane, chlorobenzene, o-dichlorobenzene, m-dichlorobenzene, p-dichlorobenzene, 1,2,4-trichlorobenzene, o-chlorotoluene, m-chlorotoluene and p-chlorotoluene, and they are not restrictive. These solvents may be used singly or in a combination of two or more thereof. Particularly preferable are the halogenated hydrocarbon solvents.

No particular restriction is put on the amount of the organic solvent, but its employment itself of a large amount only deteriorates operation efficiency, productivity and the like. In general, the amount of the organic solvent is preferably 100 (volume/weight) times or less as much as that of the compound (1).

No particular restriction is put on the operation and procedure of the reaction A. As the preferable usual procedure, for example, there can be used a process which comprises placing sulfuric acid, the compound (1) and if desired, the organic solvent in a reaction vessel, and then adding the compound (2) to the resulting mixture.

Another process, i.e., the so-called divisional feed process can also be utilized which comprises placing sulfuric acid, a part of the compound (1) and if desired, the organic solvent in the reaction vessel, feeding a part of the compound (2) to the resulting mixture, further feeding the residue of the compound (1) to the mixture, and then adding the residue of the compound (2) thereto.

As the feed procedure of the compound (2), an applicable procedure comprises feeding the compound (2) continuously or intermittently in a multistage technique by known means and devices (e.g., a dropping device and a metering pump). Needless to say, another process-engineeringly practical procedure is also applicable.

The compound (2) may be fed in a neat state or in the form of a solution in which the compound (2) is dissolved in the organic solvent. No particular restriction is put on a feed rate of the compound (2), but in general, a feed time required is in the range of from about 0.5 to about 15 hours, preferably from about 1 to about 10 hours.

It is preferable for the improvement of a reaction efficiency that the reaction A is carried out with stirring. No particular restriction is put on the stirring technique and the stirring device, but the stirring device having a stirring power which permits the efficient progress of the reaction is preferably used. Examples of the reaction device include a tank type reaction device and a tubular reaction device equipped with a stirrer such as a propeller stirrer, a turbine stirrer, a paddle stirrer, a homogenizer, a homomixer, a line mixer or a line homomixer. The reaction A can be carried out by batch process or continuous process.

In performing the preparation process of the present invention, the reaction temperature of the reaction A is required to be −20° C. or higher but lower than 40° C., preferably from 0° to 38° C., more preferably 10° to 35° C.

If the reaction temperature is 40° C. or higher, the prepared polyvalent metal salt of the salicylic acid resin is scarcely formed as fine particles at the time of dispersion and even if an aqueous dispersion is obtained, it tends to be poor in stability, though this reason is not definite. Furthermore, a developing sheet for pressure sensitive recording material which can be prepared by the use of the obtained polyvalent metal salt of the salicylic acid resin has a drawback such as poor abrasion resistance, which is not preferable as the developer for the pressure sensitive recording material.

If the reaction temperature is lower than −20° C., the reaction does not proceed smoothly.

The preparation process of the present invention is characterized by performing the reaction A at a temperature of −20° C. or higher but lower than 40° C. The progress of the reaction can be monitored by measuring a rate of change of the compound (1) and/or the compound (2) by the use of a known analytical means such as proton NMR spectrum or high-performance liquid chromatography (HPLC), and so the reaction time can be determined on the basis of the results of the analytical means.

The performance of the reaction for a long period of time does not have a bad influence on the characteristics of the product, but the consumption of the long time only leads to the deterioration of operation efficiency, productivity and the like. In general, when the reaction A is carried out, the reaction time is longer than the feed time of the compound (2), and after the feed of the compound (2), the solution may be allowed to stand or may be stirred at a temperature of +20° C. or higher but lower than 40° C. for an optional time. The reaction is usually carried out for a time of from about 1 to about 20 hours, preferably from about 2 to about 15 hours.

The reaction A can usually be carried out under atmospheric pressure, but if desired, it may be done under reduced pressure or under increased pressure. Furthermore, the reaction can be performed in the atmosphere, but it may be done in the presence of an inert gas (e.g., a gas such as nitrogen, helium or argon).

The resin obtained by the reaction A (hereinafter referred to as "resin A") can be taken out from the reaction system in a known manner, or alternatively, the resin can be used in the subsequent reaction with the polyvalent metal compound (the reaction B) instead of being taken out from the reaction system.

The resin A is a resin having a complicated composition which comprises various compounds formed by various reactions of reactive oligomers.

Preferable examples of the polyvalent metal salt of the salicylic acid resin of the present invention include water-sparingly soluble and water-insoluble divalent, trivalent and tetravalent metal salts, and above all, the divalent metal salts are more preferable. Typical examples of the polyvalent metal salt include salts of zinc, magnesium, calcium, barium, nickel, tin, copper, molybdenum, tungsten, zirconium, manganese, cobalt, titanium, aluminum and iron, and these examples are not restrictive. The polyvalent metal salts may be used singly or in a combination of two or more thereof. Above all, a zinc salt is particularly preferable.

Reaction B

The polyvalent metal salt of the salicylic acid resin of the present invention can be prepared by reacting the resin A with a polyvalent metal compound. No particular restriction is put on its preparation procedure, and any known process can be used. For example, there can be used the preparation method which comprises melting the resin A and the polyvalent metal compound (e.g., an oxide, a hydroxide, a carbonate, a silicate or an organic carboxylate of a polyvalent metal) (the melting method), and the preparation method which comprises reacting a salt of the resin A such as an alkali metal salt, an amine salt or an ammonium salt of the resin A with the polyvalent metal compound in the presence of water (the double decomposition method). It is preferred that the polyvalent metal salt of the salicylic acid resin of the present invention is prepared by the double decomposition method.

In the case that the reaction B is carried out by the melting method, as a usual method, there can be recited a method which comprises heating and melting the resin A and an oxide, a hydroxide, a carbonate or a silicate of a polyvalent metal, or a polyvalent metal salt of an organic carboxylic acid such as zinc acetate, zinc caproate, zinc stearate or zinc benzoate at a temperature of from about 100° to 180° C. for a period of about 1 to about 5 hours. In this case, prior to the heating and melting, there may be added a basic substance such as ammonium acetate, ammonium caproate, ammonium stearate or ammonium benzoate.

In the case that the reaction B is carried out by the double decomposition method, as a usual method, there can be recited a method which comprises reacting the carboxyl group of the resin A with about equivalent of an alkali metal compound (e.g., lithium hydroxide, sodium hydroxide, potassium hydroxide, sodium carbonate, potassium carbonate or sodium hydrogencarbonate) or an amine compound (e.g., methylamine, ethylamine, dimethylamine, diethylamine, trimethylamine, triethylamine, ethanolamine, isopropanolamine, triethanolamine, 2-dimethylaminoethanol, morpholine or ammonia) in the presence of water to prepare the alkali metal salt, an amine salt or an ammonium salt of the resin A, and then reacting the resulting reaction product with the polyvalent metal compound to produce a water-sparingly soluble or water-insoluble polyvalent metal salt of the salicylic acid resin. In this case, the polyvalent metal compound may be added to the alkali metal salt of the resin A or the like, or alternatively, the alkali metal salt of the resin A or the like may be added to the polyvalent metal compound.

No particular restriction is put on a reaction temperature in preparing the polyvalent metal salt of the salicylic acid resin of the present invention in accordance with the double decomposition method by the use of the alkali metal salt of the resin A or the like and the polyvalent metal compound. For example, in the case that the double decomposition method is carried out in the presence of water or an organic solvent (e.g., a hydrocarbon solvent such as toluene or xylene, or a halogenated hydrocarbon solvent such as tetrachloroethylene or 1,2-dichloroethane) which sufficiently dissolve water and the polyvalent metal salt of the salicylic acid resin, no particular restriction is put on the temperature of the reaction, but the double decomposition method is preferably performed at a temperature lower than the boiling point of water or the selected organic solvent, more preferably at a temperature of from 0° to 55° C.

For the improvement of reaction efficiency, the reaction of the double decomposition method is preferably done by the use of a mixing machine equipped with a suitable stirrer or mixer. Examples of the mixing machine include mixing machines using no medium such as a propeller stirrer, a turbine stirrer, a paddle stirrer, a homogenizer, a homomixer, a line mixer and a line homomixer, stirring tank type mills such as an attritor and a sentry mill, flow pipe type mills such as a sand grinder, a grain mill, a pearl mill, a matter mill and a dyno mill, and annular type continuous wet stirring mills filled with a medium (e.g., glass beads, ceramic balls or steel balls) such as a conical ball mill and an annular mill. The double decomposition method can be carried out by a batch process or a continuous process by combining these reaction devices.

The reaction between the alkali metal salt or the like of the resin A and the polyvalent metal compound can usually be carried out under atmospheric pressure, but if desired, the reaction can be done under reduced pressure or under increased pressure. In addition, the reaction can be performed in the atmosphere, but it may be done in the presence of an inert gas (e.g., a gas such as nitrogen, helium or argon).

Preferable examples of the polyvalent metal compound include water-soluble divalent, trivalent and tetravalent metal compounds. Typical examples of the polyvalent metal compound include sulfates such as zinc sulfate, magnesium sulfate, calcium sulfate and aluminum sulfate, chlorides such as zinc chloride, magnesium chloride, calcium chloride, barium chloride, nickel chloride, cobalt chloride and aluminum chloride, acetates such as zinc acetate and manganese acetate, and a nitrate such as zinc nitrate. These polyvalent metal compounds may be used singly or in a combination of two or more thereof.

The polyvalent metal compound may be used in the state of a solid or an aqueous solution.

The amount of the polyvalent metal compound is usually in the range of from 0.8 to 1.5 equivalents, preferably from 1.0 to 1.2 equivalents per equivalent of the alkali metal salt of the resin A. Here, if the polyvalent metal compound is, for example, the divalent metal compound (e.g., zinc sulfate), 1 equivalent of the polyvalent metal compound means 0.5 mol of the divalent metal compound per 1 mol of the alkali metal salt of the resin A.

The polyvalent metal salt of the salicylic acid resin of the present invention which can be prepared by the above process is a resin obtained by reacting the resin A with the polyvalent metal compound, and the composition of the thus obtained salt is more intricate than that of the resin A.

The molecular weight of the polyvalent metal salt of the salicylic acid resin of the present invention depends largely upon the amounts of the compound (1) and/or the compound (2) to be used and the reaction conditions, but in the case that the polyvalent metal salt is used as a developer for pressure sensitive recording material, the molecular weight of the polyvalent metal salt of the salicylic acid resin of the present invention is preferably in the range of from about 350 to about 2000, more preferably from about 400 to about 1500.

In general, the softening point of the polyvalent metal salt of the salicylic acid resin of the present invention is in the range of from about 60° to about 150° C.

Reference will be made to an aqueous dispersion in which the polyvalent metal salt of the salicylic acid resin of the present invention is dispersed, and a developing sheet for pressure sensitive record in which the polyvalent metal salt of the resin is used as a developer.

When the polyvalent metal salt of the salicylic acid resin of the present invention is prepared in the presence of water by the double decomposition method, this polyvalent metal salt usually precipitates in the aqueous medium in a short period of time. The thus precipitated polyvalent metal salt can be easily filtered and isolated from the aqueous medium by a known means and device without using any specific equipment. After the filtration, the precipitated polyvalent metal salt is dried, and then subjected to a dispersion treatment by a known means and device, or after the filtration, the precipitated salt is subjected to the dispersion treatment without undergoing the drying step, thereby preparing a dispersion of the developing agent for pressure sensitive recording material. Alternatively, the aqueous medium containing the precipitated polyvalent metal salt of the salicylic acid resin may be directly subjected to the dispersion treatment without undergoing the filtration step, thereby preparing the dispersion.

When the double decomposition method is carried out in the presence of water and an organic solvent (e.g., a hydrocarbon solvent such as toluene or xylene, or a halogenated hydrocarbon solvent such as tetrachloroethylene or 1,2-dichloroethane) which sufficiently dissolve the polyvalent metal salt of the salicylic acid resin, a mixed solution of the organic solvent containing water and the polyvalent metal salt of the salicylic acid resin can be emulsified and dispersed, followed by removing the organic solvent from the system, to prepare the dispersion of a developer for pressure sensitive recording material.

In order to prepare the dispersion of the developer for pressure sensitive recording material and the like, the polyvalent metal salt of the salicylic acid resin is usually subjected to the dispersion treatment in an aqueous medium, and in this case, the desired dispersion can be obtained as an aqueous dispersion. In general, the polyvalent metal salt (developer) of the salicylic acid resin is ground to an average particle diameter of 3 μm or less, preferably 2 μm or less, and then dispersed.

As methods for obtaining the aqueous dispersion, there can be used (1) a method which comprises grinding and then dispersing the polyvalent metal salt of the salicylic acid resin in an aqueous medium by the use of a dispersing machine such as a ball mill, an attritor, a sand grinder, a pebble mill, a cobble mill, a dyno mill, a high-speed impeller dispersing machine, a high-speed stone mill or an annular mill, thereby obtaining the desired aqueous dispersion, and (2) a method which comprises dissolving the polyvalent metal salt of the salicylic acid resin in an organic solvent, emulsifying and dispersing in an aqueous medium by the use of, for example, an ultrasonic dispersing machine, a homogenizer, a homomixer or a line homomixer, and then removing the organic solvent, thereby obtaining the desired aqueous dispersion.

In the above method (2), the organic solvent which can be used is preferably has a low solubility in water, a high solubility of the developer and a relatively low boiling point. Examples of such an organic solvent include hydrocarbon solvents such as benzene, toluene, xylene, ethylbenzene and 1-methylnaphthalene, halogenated hydrocarbon solvents such as dichloromethane, chloroform, tetrachloroethylene, 1,2-dichloroethane, 1,1,1-trichloroethane, 1,1,2-trichloroethane, 1,1,2,2-tetrachloroethane, chlorobenzene, o-dichlorobenzene, m-dichlorobenzene, p-dichlorobenzene, o-chlorotoluene, m-chlorotoluene and p-chlorotoluene, ketone solvents such as methyl ethyl ketone, methyl isobutyl ketone and cyclohexanone, ester solvents such as ethyl acetate, butyl acetate and amyl acetate, and alcohol solvents such as butanol, pentanol, hexanol and cyclohexanol. These organic solvents may be used singly or in a combination of two or more thereof.

No particular restriction is put on the amount of the organic solvent to be used, but it is usually in the range of from about 5 to 500 parts by weight, preferably 20 to 300 parts by weight with respect to 100 parts by weight of the polyvalent metal salt of the salicylic acid resin according to the present invention. In this case, the emulsifying dispersion treatment is carried out at a temperature lower than the boiling point of the organic solvent under atmospheric pressure or under increased pressure. After the dispersion treatment, the organic solvent is distilled off to obtain the aqueous dispersion of the developer. The organic solvent can be distilled off by heating the solution at a temperature higher than the boiling point of the organic solvent under atmospheric pressure or under reduced pressure.

The thus obtained aqueous dispersion of the developer, if desired, can be further subjected to the dispersion treatment by the use of the above dispersing machine (e.g., a sand grinder or an annular mill).

A dispersant which can be used in the aqueous medium at the time of the dispersion preferably is an ionic or a nonionic surface active agent.

Examples of the dispersant include synthetic and natural polymeric compounds such as polyvinyl alcohols, alkyl-modified polyvinyl alcohols, cyanoethyl-modified polyvinyl alcohols, ether-modified polyvinyl alcohols, polyacrylamides, polyacrylic acids, acrylamide-alkyl acrylate copolymers, alkaline metal salts of polystyrenesulfonic acid, maleic anhydride-isobutylene copolymers, carboxymethyl cellulose, hydroxyethyl cellulose, polyvinyl pyrrolidone, starch and its derivatives, casein, gum arabic, agar and gelatin, alkaline metal salts of alkylbenzenesulfonic acid, alkaline metal salts of alkylnaphthalenesulfonic acid, alkaline metal salts of dialkylsulfosuccinic acid, alkaline metal salts of alkylsulfonic acid, polyoxyethylene alkyl ethers, polyoxyethylene alkylphenyl ethers and polyvalent alcohol fatty acid esters. These dispersants may be used singly or in a combination of two or more thereof. No particular restriction is put on the amount of the dispersant to be used, but it is usually in the range of from about 1 to 30 parts by weight with respect to 100 parts by weight of the polyvalent metal salt of the salicylic acid resin.

No particular restriction is put on the amount of water to be used in preparing the aqueous dispersion, but this amount is usually such that the concentration of the developer in the aqueous dispersion is preferably in the ange of from about 3 to 50% by weight, more preferably from about 5 to 40% by weight.

In the case that the thus obtained aqueous solution of the developer is used as a coating solution for forming a developer layer on a support, a binder, a pigment and the like are usually further blended.

No particular restriction is put on the kind of binder, but examples of the usable binder include synthetic and natural polymeric compounds such as polyvinyl alcohol, casein, starch and its derivatives, gum arabic, methyl cellulose, carboxymethyl cellulose, polyacrylic acid, and latexes such as styrene-butadiene copolymer latex and acrylic ester latex.

No particular restriction is put on the amount of the binder, but this amount is usually adjusted so as to be in the range of from 5 to 40% by weight, preferably from 10 to 30% by weight of the total solid amount of the developer coating solution.

Examples of the pigment which can be used in the present invention include inorganic pigments such as zinc oxide, zinc carbonate, calcium carbonate, magnesium carbonate, barium carbonate, magnesium sulfate, barium sulfate, titanium oxide, talc, kaolin, active China clay, diatomaceous earth, zinc hydroxide, aluminum hydroxide, magnesium hydroxide, alumina and silica, and organic pigments such as styrene microballs, nylon particles, a urea-formaldehyde filler, polyethylene particles, a cellulose filler and starch particles.

No particular restriction is put on the amount of the pigment, but in general, this amount is adjusted so as to be in the range of from about 30 to 90% by weight of the total solid amount of the developer coating solution.

Furthermore, if desired, various kinds of additives (e.g., an ultraviolet absorber, a defoamer, a pH adjuster, a viscosity modifier, a plasticizer and an organic polymeric compound) may be added to the coating solution of the above developer layer.

A support (e.g., a paper, a plastic sheet, a synthetic paper or a composite sheet obtained by combining them) is coated with the thus prepared coating solution for the preparation of a developing sheet in a known manner, for example, by the use of a coating device such as an air-knife coater, a blade coater, a roll coater, a size press coater, a curtain coater or a short dwell coater to form the developer layer, whereby the developing sheet can be prepared.

No particular restriction is put on the weight (coating weight) of the developer layer on the support, but it is 0.5 g/m² or more, preferably from 0.5 to 10 g/m² in terms of dry weight. Furthermore, the content of the polyvalent metal salt of the salicylic acid resin according to the present invention in the developer layer is usually 5% by weight or more, preferably from 5 to 70% by weight.

Moreover, in the preparation of the developing sheet according to the present invention, the polyvalent metal salt of the salicylic acid resin regarding the present invention can be used together with another known developer [e.g., acidic clay minerals such as acidic China clay, active China clay, attapulgite and bentonite, a phenolic resin such as a phenol-formaldehyde resin and a phenol-salicylic acid-formaldehyde resin, and metal salts of zinc salts of aromatic carboxylic acids such as phthalic acid, salicylic acid, 5-cyclohexylsalicylic acid, 5-tert-octylsalicylic acid, 5-nonylsalicylic acid, 3,5-dinonylsalicylic acid, 3-(α-methylbenzyl)salicylic acid, 5-(α-methylbenzyl)salicylic acid, 5-phenylsalicylic acid, 3,5-di(α-methylbenzyl)salicylic acid, 3,5-di(α,α-dimethylbenzyl)salicylic acid and 3,5-di-tert-butylsalicylic acid], so long as the desired effect of the present invention is not impaired.

No particular restriction is put on the morphology of the developing sheet according to the present invention, but for example, there are (1) a CF-sheet which can be used in combination with a CB-sheet having a back surface coated with microcapsules containing an electron donating color developing compound and a capsule oil, (2) a CF/CB-sheet having a developer layer on the surface of the sheet and a microcapsule layer on the back surface of the sheet, the CF/CB-sheet being interposed between the CB-sheet and the CF-sheet in order to obtain a plurality of copies, and (3) a single copy sheet having one surface coated with both of the microcapsules and the developer.

The above-mentioned microcapsules can be prepared by dissolving the electron donating color former in the capsule oil, and then subjecting the resulting solution to a known microencapsulation method such as a coacervation method, an interfacial polymerization method, an internal polymerization method, a phase separation method or an external polymerization method.

Examples of the electron donating color former include various known compounds such as triarylmethane compounds, diarylmethane compounds, Rhodamine-lactam compounds, fluoran compounds, indolylphthalide compounds, pyridine compounds, spiro compounds, fluorene compounds and phenothiazine compounds.

Examples of the capsule oil include various oils such as cotton seed oil, castor oil, kerosine, paraffins, chlorinated paraffins, naphthenic oils, alkylated biphenyls, alkylated terphenyls, alkylated naphthalenes, diaryl alkanes, hydrogenated terphenyls and dialkyl phthalates. These capsule oils may be used singly or in a combination of two or more thereof.

Now, the present invention will be described in detail in reference to examples, but the scope of the present invention should not be limited to these examples.

In the examples, a weight average molecular weight was measured by GPC (gel permeation chromatography), and a softening point was measured by a ring and ball softening point measuring device in accordance with JIS-K-2548.

EXAMPLE 1

In a glass reaction vessel were placed 27.6 g (0.2 mol) of salicylic acid, 12 g of 98% by weight sulfuric acid (43% by weight based on the weight of salicylic acid) and 50 ml of 1,2-dichloroethane, and 62.5 g (0.6 mol) of styrene was fed to the solution at 30° C. with stirring the solution through a dropping funnel over 7 hours. After the feed, the mixture was further stirred for 2 hours at the same temperature. After the solution was neutralized with a 5% by weight aqueous sodium hydroxide solution, 1,2-dichloroethane was distilled off. Water (500 ml) was added to the residue, and an aqueous solution (200 ml) of zinc sulfate heptahydrate (29 g) was added dropwise to the solution at 40° C. over 1 hour. Furthermore, the solution was stirred at room temperature for 2 hours, filtered, washed with water, and then dried to obtain 92 g of a zinc salt of a colorless salicylic acid resin. The weight average molecular weight and the softening point of the product was 560° and 115° C., respectively.

EXAMPLE 2

The same procedure as in the Example 1 was effected except that 62.5 g of styrene was replaced with 83.3 g (0.8 mol) of styrene to obtain 114 g of a zinc salt of a colorless salicylic acid resin. The weight average molecular weight and the softening point of the product was 650° and 117° C., respectively.

EXAMPLE 3

The same procedure as in the Example 1 was effected except that 12 g of 98% by weight sulfuric acid was replaced with 20 g (71% by weight to salicylic acid) of 98% by weight sulfuric acid to obtain 94 g of a zinc salt of a colorless salicylic acid resin. The weight average molecular weight and the softening point of the product was 620° and 115° C., respectively.

EXAMPLE 4

The same procedure as in the Example 1 was effected except that 27.6 g of salicylic acid was replaced with 20.7 g (0.15 mol) of salicylic acid and 7.6 g (0.05 mol) of 3-methylsalicylic acid to obtain 94 g of a zinc salt of a colorless salicylic acid resin. The weight average molecular weight and the softening point of the product was 590° and 114° C., respectively.

EXAMPLE 5

In a glass reaction vessel were placed 27.6 g (0.2 mol) of salicylic acid, 7 g of 98% by weight sulfuric acid (25% by weight based on the weight of salicylic acid) and 50 ml of 1,2-dichloroethane, and 104.2 g (1.0 mol) of styrene was fed to the solution at 10° C. with stirring the solution through a dropping funnel over 8 hours. After the feed, the mixture was further stirred for 2 hours at 20° C. After the solution was neutralized with a 5% by weight aqueous sodium hydroxide solution, 1,2-dichloroethane was distilled off. Water (500 ml) was added to the residue, and an aqueous solution (200 ml) of zinc sulfate heptahydrate (29 g) was added dropwise to the solution at 40° C. over 1 hour. Furthermore, the solution was stirred at room temperature for 2 hours, filtered, washed with water, and then dried to obtain 134 g of a zinc salt of a colorless salicylic acid resin. The weight average molecular weight and the softening point of the product was 800° and 122° C., respectively.

EXAMPLE 6

In a glass reaction vessel were placed 27.6 g (0.2 mol) of salicylic acid, 14 g of 98% by weight sulfuric acid (50% by weight based on the weight of salicylic acid) and 50 ml of 1,2-dichloroethane, and a mixture of 62.5 g (0.6 mol) of styrene and 23.6 g (0.2 mol) of 4-methylstyrene was fed to the solution at 40° C. with stirring the solution through a dropping funnel over 6 hours. After the feed, the mixture was further stirred for 2 hours at the same temperature. After the solution was neutralized with a 5% by weight aqueous sodium hydroxide solution, 1,2-dichloroethane was distilled off. Water (500 ml) was added to the residue, and an aqueous solution (200 ml) of zinc sulfate heptahydrate (29 g) was added dropwise to the solution at 40° C. over 1 hour. Furthermore, the solution was stirred at room temperature for 2 hours, filtered, washed with water, and then dried to obtain 114 g of a zinc salt of a colorless salicylic acid resin. The weight average molecular weight and the softening point of the product was 720° and 115° C., respectively.

EXAMPLE 7

In a glass reaction vessel were placed 27.6 g (0.2 mol) of salicylic acid, 12 g of 98% by weight sulfuric acid (43% by weight based on the weight of salicylic acid) and 50 ml of 1,2-dichloroethane, and 72.8 g (0.7 mol) of styrene was fed to the solution at 35° C. with stirring the solution through a dropping funnel over 7 hours. After the feed, the mixture was further stirred for 2 hours at the same temperature. After the solution was neutralized with a 5% by weight aqueous sodium hydroxide solution, 1,2-dichloroethane was distilled off. Water (500 ml) was added to the residue, and an aqueous solution (200 ml) of zinc sulfate heptahydrate (29 g) was added dropwise to the solution at 40° C. over 1 hour. Furthermore, the solution was stirred at room temperature for 2 hours, filtered, washed with water, and then dried to obtain 102 g of a zinc salt of a colorless salicylic acid resin. The weight average molecular weight and the softening point of the product was 620° and 113° C. respectively

EXAMPLE 8

The same procedure as in the Example 7 was effected except that styrene was fed at 38° C. instead of 35° C. to obtain 103 g of a zinc salt of a colorless salicylic acid resin. The weight average molecular weight and the softening point of the product was 600° and 113° C., respectively.

COMPARATIVE EXAMPLE 1

At a temperature of from about 50° to 60° C., 62.4 g (0.6 mol) of styrene was added to the mixture of 27.6 g (0.2 mol) of salicylic acid and 1 g of concentrated sulfuric acid in 60 ml of chlorobenzene, followed by stirring at 130° C. for 3 hours. Next, 21.9 g of zinc acetate dihydrate was added to the resulting mixture at 50° C. Afterward, the solvent was all removed by vacuum distillation to obtain 96.2 g of a zinc salt of the salicylic acid resin colored yellow. The softening point of the product was 45° C. This zinc salt of the resin was colored and had the low softening point, and thus the product had a low practical value as a developer for pressure sensitive record.

COMPARATIVE EXAMPLE 2

In a glass reaction vessel were placed 15.2 g (0.1 mol) of methyl salicylate, 3.7 g of 98% by weight sulfuric acid and 50 ml of 1,2-dichloroethane, and 38.4 g (0.3 mol) of 4-methystyrene was fed to the solution at 0° to 2° C. with stirring the solution through a dropping funnel over 6 hours. After the feed, the mixture was further stirred for 3 hours at the same temperature. Next, the solution was neutralized with a 5% by weight aqueous sodium hydroxide solution, followed by heating to distill off 1,2-dichloroethane. Furthermore, an aqueous sodium hydroxide (4 g) solution (100 ml) was added, and the solution was heated and stirred at 95° C. for 6 hours.

Afterward, water (300 ml) was added to the solution, and an aqueous solution (200 ml) of zinc sulfate heptahydrate (14.5 g) was added dropwise to the solution at 25° C. over 1 hour. Furthermore, the solution was stirred at room temperature for 2 hours, filtered, washed with water, and then dried to obtain 53 g of a zinc salt of a colorless salicylic acid resin. The softening point of the product as 112° C.

COMPARATIVE EXAMPLE 3

The same procedure as in the Example 7 was effected except that styrene was fed at 42° C. instead of 35° C. to obtain 102 g of a zinc salt of a colorless salicylic acid resin. The weight average molecular weight and the softening point of the product was 580° and 108° C., respectively.

COMPARATIVE EXAMPLE 4

The same procedure as in the Example 7 was effected except that styrene was fed at 46° C. instead of 35° C. to obtain 102 g of a zinc salt of a colorless salicylic acid resin. The weight average molecular weight and the softening point of the product was 560° and 103° C., respectively.

EXAMPLES 9 TO 16, AND COMPARATIVE EXAMPLES 5 TO 8

A mixture of the following composition was prepared by the use of each of the zinc salts of the salicylic acid resins manufactured in Examples 1 to 8 and Comparative Examples 1 to 4:

Zinc salt of salicylic acid resin 50 g

Sodium salt of sulfonated polystyrene 2 g

Water 120 g

The mixture having the above composition was subjected to a dispersion treatment at 25° C. for 4 hours by a sand grinder. A bubbling state at the time of the dispersion was visually observed. Evaluation was made by representing the less bubbling state by O, and representing the very vigorous bubbling state by X.

For the inspection of a dispersion efficiency, an average particle diameter of the zinc salt of the salicylic acid was measured after the dispersion treatment was carried out for 4 hours. In this case, the measurement of the average particle diameter was done by the use of a coulter counter.

Furthermore, a dispersing state of the dispersion was visually observed after the dispersion which had undergone the dispersion treatment was allowed to stand at 50° C. for one week. Evaluation is made by the use of O and X, and O means such a dispersing state as to be capable of applying in the form of a sheet and X means that the dispersion is so coagulative as not to apply in the form of the sheet. The results are shown in Table 1.

As shown in Table 1, the samples which were used herein were the zinc salts manufactured in Examples 1 to 8 and Comparative Examples 1 to 4.

EXAMPLES 17 TO 24, AND COMPARATIVE EXAMPLES 9 TO 11

Developing sheets for pressure sensitive record were prepared by the use of the respective zinc salts of salicylic acid resins obtained in Examples 1 to 8, the respective zinc salts of salicylic acid resins obtained in Comparative Examples 3 and 4, and a zinc salt of 3,5-di($\alpha$-methylbenzyl)salicylic acid as developers in accordance with the following procedure, and evaluation was made in the undermentioned manner. The results of the performance evaluation are shown in Table 2.

Preparation procedure of developing sheets for pressure sensitive record:

Each mixture having the following composition was dispersed by a sand grinder to obtain a dispersion (A):

Developer 50 g

Sodium salt of sulfonated polystyrene 2 g

Water 120 g

As shown in Table 2, the developers which were used herein were the zinc salts of salicylic acid resins obtained in Examples 1 to 8, the zinc salts of salicylic acid resins obtained in Comparative Examples 3 and 4, and zinc salt of 3,5-di($\alpha$-methylbenzyl)salicylic acid.

A dispersion having the following composition was prepared by the use of the above dispersion (A).

Dispersion (A) 8.0 g

Precipitated calcium carbonate 30 g

Starch 0.8 g

Synthetic rubber latex 0.8 g

Water 77.4 g

A high-quality paper (50 g/m$^2$) was coated with this dispersion so that a dry coating weight might be 5.0 g/m$^2$, and then dried to prepare a developing sheet (a CF-sheet).

Evaluation of the developing sheets for pressure sensitive record (1) Measurement of color density

TABLE 1

| Example | Zinc Salt of Salicylic Acid Resin Used | Bubbling State at Dispersion | Average Particle Diameter after Dispersion Treatment for 4 hours | Dispersion State after One Week |
| --- | --- | --- | --- | --- |
| Example 9 | Salt of Example 1 | O | 1.5 μm | O |
| Example 10 | Salt of Example 2 | O | 1.6 μm | O |
| Example 11 | Salt of Example 3 | O | 1.5 μm | O |
| Example 12 | Salt of Example 4 | O | 1.4 μm | O |
| Example 13 | Salt of Example 5 | O | 1.6 μm | O |
| Example 14 | Salt of Example 6 | O | 1.5 μm | O |
| Example 15 | Salt of Example 7 | O | 1.6 μm | O |
| Example 16 | Salt of Example 8 | O | 1.7 μm | O |
| Comp. Ex. 5 | Salt of Comp. Ex. 1 | X | 2.8 μm | X |
| Comp. Ex. 6 | Salt of Comp. Ex. 2 | X | 2.5 μm | X |
| Comp. Ex. 7 | Salt of Comp. Ex. 3 | X | 2.0 μm | O |
| Comp. Ex. 8 | Salt of Comp. Ex. 4 | X | 2.2 μm | O |

It is apparent from the results shown in Table 1 that the polyvalent metal salts of the salicylic acid resins of the present invention can control the bubbling at the time of the dispersion and so can facilitate the formation of fine particles thereof. Furthermore, after the dispersion treatment, the obtained dispersions scarcely coagulate, and so it is also apparent that they are excellent in storage stability.

A color density was measured at 20° C. and a relative humidity of 65% in a constant temperature constant humidity chamber.

A commercially available CB-sheet for blue color generation (N-40, made by Mitsubishi Paper Mills, Ltd.) coated with microcapsules containing Crystal Violet Lactone (CVL) as a main electron donating color former was superposed upon each of the developing sheet for pressure sensitive record (a CF-sheet) obtained by the above procedure so that the coated surfaces of both the sheets might face to each other, and an electronic typewriter was used to apply pressure to the sheets, thereby generating the color.

After the application of the pressure, the sheets were allowed to stand for 24 hours under the same circumstances, and a color density was then measured. In this case, the density of a colored image was measured by the use of a Σ-80 color difference meter and it was represented by a Y value. The color having the low Y value is estimated to have the high density.

(2) Test of water resistance of colored image

The developing sheet colored by the procedure as described in the above paragraph (1) was immersed in water at 20° C. for 24 hours, and the density of the colored image was measured by the use of the Σ-80 color difference meter to represent the density as a Y value. The colored image having a small difference between the Y values before and after the test is estimated to have the excellent water resistance.

Furthermore, the colored image after the test of the water resistance was visually observed, and the results of the observation are shown in Table 2. In this table, evaluation is made by the use of O and X, and O means that the colored image can be sufficiently distinguished in the same state as before the test and X means that the colored image disappears and the colored image before the test cannot be distinguished any more.

(3) Test of abrasion resistance

The test of the abrasion resistance was carried out at 20° C. and a relative humidity of 65% in a constant temperature constant humidity chamber.

A commercially available CB-sheet for blue color generation (N-40, made by Mitsubishi Paper Mills, Ltd.) coated with microcapsules containing Crystal Violet Lactone (CVL) as a main electron donating color former was superposed upon each of the developing sheet for pressure sensitive record (a CF-sheet) obtained by the above procedure so that the coated surfaces of both the sheets might face to each other, and they were then abraded on each other 5 times while a load of 5 kg/cm² was applied. Evaluation was made on the basis of a degree of color soil on the developing sheet for pressure sensitive record. In this case, the density of the colored image on an abraded and soiled portion was measured by a Macbeth reflection densitometer.

The sheet having a small value is estimated to be less soiled and to have practically excellent properties.

TABLE 2

| Example | Developer (zinc salt of salicylic acid resin) | Color Density | Color Density after Test of Water Resistance | Visual Observation after Test of Water Resistance | Abrasion Soil |
|---|---|---|---|---|---|
| Example 17 | Developer of Example 1 | 36.5 | 38.9 | O | 0.12 |
| Example 18 | Developer of Example 2 | 36.4 | 39.0 | O | 0.13 |
| Example 19 | Developer of Example 3 | 36.3 | 39.3 | O | 0.12 |
| Example 20 | Developer of Example 4 | 36.4 | 39.2 | O | 0.13 |
| Example 21 | Developer of Example 5 | 36.4 | 39.1 | O | 0.12 |
| Example 22 | Developer of Example 6 | 36.3 | 39.0 | O | 0.13 |
| Example 23 | Developer of Example 7 | 36.4 | 38.5 | O | 0.13 |
| Example 24 | Developer of Example 8 | 36.5 | 38.4 | O | 0.15 |
| Comp. Ex. 9 | Developer of Comp. Ex. 3 | 36.7 | 40.0 | O | 0.21 |
| Comp. Ex. 10 | Developer of Comp. Ex. 4 | 37.2 | 40.5 | O | 0.25 |
| Comp. Ex. 11 | Known Article* | 36.5 | 84.0 | X | 0.23 |

*Zinc salt of 3,5-di(α-methylbenzyl)salicylic acid.

It is apparent from the results of Table 2 that the developing sheets for pressure sensitive record in which the polyvalent metal salts of the salicylic acid resins of the present invention are used as the developers are excellent in the storage stability (water resistance) of the colored images and the abrasion soil resistance.

What is claimed is:

1. A process for preparing a polyvalent metal salt of a salicylic acid resin which comprises the steps of reacting salicylic acid or its derivative represented by the formula (1)

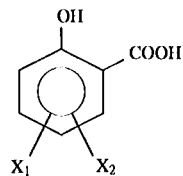

(1)

wherein $X_1$ and $X_2$ are each a hydrogen atom, a $C_1$–$C_{12}$ alkyl group, a $C_1$–$C_{12}$ alkoxy group or a halogen atom, with styrene or its derivative represented by the formula (2)

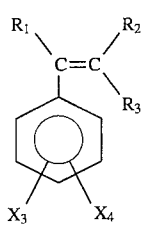 (2)

wherein $R_1$, $R_2$ and $R_3$ are each a hydrogen atom or a $C_1$–$C_4$ alkyl group; $X_3$ and $X_4$ are each a hydrogen atom, a $C_1$–$C_{12}$ alkyl group, a $C_1$–$C_{12}$ alkoxy group, a $C_7$–$C_{10}$ aralkyl group, a $C_6$–$C_{10}$ aryl group or a halogen atom, at a temperature lower than 40° C. but not lower than –20° C. in the presence of sulfuric acid having a concentration of about 90% by weight or more, and then reacting the resulting reaction product with a polyvalent metal compound selected from the group consisting of zinc compounds, magnesium compounds, calcium compounds, barium compounds, nickel compounds, cobalt compounds and aluminum compounds.

2. The process for preparing a polyvalent metal salt of a salicylic acid resin according to claim 1 wherein the reaction of salicylic acid or its derivative represented by the formula (1) with styrene or its derivative represented by the formula (2) is carried out in the presence of an organic solvent.

3. The process for preparing a polyvalent metal salt of a salicylic acid resin according to claim 2 wherein the organic solvent is a halogenated hydrocarbon solvent.

4. A polyvalent metal salt of a salicylic acid resin obtained by a preparation process described in claim 1.

5. An aqueous dispersion in which a polyvalent metal salt of a salicylic acid resin described in claim 4 is dispersed in water.

6. A developing sheet wherein a polyvalent metal salt of the salicylic acid resin described in claim 5 is coated as a developer (1) on one side of the surface of a support or, (2) on one side of the surface of the support on the other side of which is coated by a microcapsule containing an electron donating color developing compound and a capsule oil, or (3) on one side of the surface of the support together with the microcapsule.

* * * * *